(12) United States Patent
Filippi et al.

(10) Patent No.: US 7,814,798 B2
(45) Date of Patent: Oct. 19, 2010

(54) DIAPHRAGM STRUCTURE AND METHOD OF MANUFACTURING A DIAPHRAGM STRUCTURE

(75) Inventors: Dario Filippi, Houston, TX (US);
Giovanni Filippi, Houston, TX (US)

(73) Assignee: P I Components Corporation, Brenham, TX (US)

( * ) Notice: Subject to any disclaimer, the term of this patent is extended or adjusted under 35 U.S.C. 154(b) by 37 days.

(21) Appl. No.: 12/212,280

(22) Filed: Sep. 17, 2008

(65) Prior Publication Data

US 2010/0064816 A1 Mar. 18, 2010

(51) Int. Cl.
*G01L 7/08* (2006.01)
(52) U.S. Cl. ........................................ 73/715
(58) Field of Classification Search .................. 73/715
See application file for complete search history.

(56) References Cited

U.S. PATENT DOCUMENTS

| | | | |
|---|---|---|---|
| 3,140,537 A | 7/1964 | Popoff | 29/474.3 |
| 3,675,540 A | 7/1972 | Murata et al. | 92/98 |
| 4,046,010 A | 9/1977 | Akeley | 73/406 |
| 4,136,603 A | 1/1979 | Doyle, Jr. | 92/98 |
| 4,299,159 A | 11/1981 | Förster | 92/98 |
| 4,541,282 A | 9/1985 | Auerweck et al. | 73/715 |
| 4,885,983 A | 12/1989 | Zavoda | 92/104 |
| 5,110,307 A | 5/1992 | Rapoza | 439/566 |
| 5,184,514 A | 2/1993 | Cucci et al. | 73/706 |
| 5,230,248 A | 7/1993 | Cucci et al. | 73/706 |
| 5,334,334 A | 8/1994 | Koksbang | 264/28 |
| 5,351,938 A | 10/1994 | Hegner et al. | 266/236 |
| 5,495,768 A | 3/1996 | Louwagie et al. | 73/706 |
| 6,038,961 A * | 3/2000 | Filippi et al. | 92/98 R |
| 6,120,033 A * | 9/2000 | Filippi et al. | 277/315 |
| 6,267,009 B1 | 7/2001 | Drewes et al. | 73/718 |
| 6,363,790 B1 | 4/2002 | Flögel et al. | 73/708 |
| 6,568,274 B1 | 5/2003 | Lucas et al. | 73/718 |
| 6,675,655 B2 * | 1/2004 | Broden et al. | 73/716 |
| 6,770,377 B2 * | 8/2004 | Hegner et al. | 428/469 |
| 6,945,118 B2 | 9/2005 | Maitland, Jr. et al. | 73/754 |

(Continued)

FOREIGN PATENT DOCUMENTS

DE 102005004942 8/2006

(Continued)

OTHER PUBLICATIONS

Wikipedia, http://en.wikipedia.org/wiki/Brazing, "Brazing," May 2008.

(Continued)

*Primary Examiner*—Andre J Allen
(74) *Attorney, Agent, or Firm*—Westman, Champlin & Kelly, P.A.

(57) ABSTRACT

In a particular embodiment, a process transmitter includes a corrosion resistive housing including a flange portion, where the corrosion resistive housing is formed from a first material. The process transmitter also includes an outer ring formed from a second material. The outer ring has an inner diameter and is brazed to the flange portion. The process transmitter further includes a deformable diaphragm formed from a third material, the deformable diaphragm is welded to the outer ring at a weld seam between the diaphragm and the outer ring adjacent to the inner diameter to form a fluid seal.

21 Claims, 7 Drawing Sheets

U.S. PATENT DOCUMENTS

| | | | |
|---|---|---|---|
| 7,258,059 B2 | 8/2007 | Burczyk et al. | 92/104 |
| 7,432,795 B2 * | 10/2008 | Kurtz et al. | 338/36 |
| 2003/0177837 A1 * | 9/2003 | Broden et al. | 73/716 |
| 2004/0221656 A1 * | 11/2004 | Kurtz et al. | 73/756 |
| 2005/0258218 A1 | 11/2005 | Schmaranzer et al. | 228/262.5 |
| 2006/0231597 A1 | 10/2006 | Ananthanarayanan et al. | 228/173.4 |
| 2007/0241169 A1 | 10/2007 | Arnett et al. | 228/165 |

FOREIGN PATENT DOCUMENTS

| | | |
|---|---|---|
| EP | 0940664 | 2/1999 |
| JP | 06003212 | 1/1994 |
| WO | WO02/077596 | 10/2002 |

OTHER PUBLICATIONS

"Notification of Transmittal of the International Search Report and the Written Opinion of the International Searching Authority, or the Declaration" for PCT/US2009/056579 filed Sep. 11, 2009; 14 pages.

* cited by examiner

DIAPHRAGM STRUCTURE AND METHOD OF MANUFACTURING A DIAPHRAGM STRUCTURE

FIELD OF THE DISCLOSURE

The present disclosure is generally related to a diaphragm structure and method of manufacturing a diaphragm structure. More particularly, the present disclosure is related to an isolating diaphragm structure including dissimilar metals.

BACKGROUND

Process transmitters are used to monitor process variables, such as pressure, temperature, flow and level of process fluids used in a variety of industrial processes. In some instances, process transmitters to measure pressure and/or flow parameters can include an isolating diaphragm that is coupled to industrial process equipment, such as a pipe, a reservoir, or other process equipment. Generally, the isolating diaphragm seals at least a portion of a process transmitter housing from exposure to the process fluids. Pressure measurements may be taken directly from the diaphragm based on the diaphragms deflection in response to pressure or may be taken indirectly by a remote pressure sensor that is coupled to the isolating diaphragm by a fluid filled capillary. Such pressure measurements may be used directly or may be used to calculate a fluid flow rate, for example.

Conventionally, a process transmitter housing is formed from a corrosion resistant material, such as stainless steel. The diaphragm is typically a one-piece diaphragm including an outer ring portion and a deformable diaphragm portion, which are typically formed from Tantalum or another corrosion resistant material. To join the diaphragm structure to the process transmitter housing, a brazing process is performed, which includes applying a brazing material between the outer ring of the diaphragm and the transmitter housing. The diaphragm structure and the transmitter housing are heated and cooled to join the dissimilar metals. Unfortunately, the different materials of the diaphragm structure and the transmitter housing have different coefficients of thermal expansion. The brazing process may cause buckling and other defects to form in the diaphragm structure as the different metals expand and contract at different rates.

Tantalum can be especially difficult to braze in this configuration because the coefficient of thermal expansion for Tantalum under temperature is significantly different than the coefficient of thermal expansion of the stainless steel transmitter housing. Upon cooling, the stainless steel contracts about three times more than the Tantalum diaphragm structure. As the structure cools, the tantalum diaphragm structure can buckle, causing visible damage. In some instances, such buckling may not be visibly detectable, but may nevertheless result in variability in the performance of the diaphragm structure. Traditionally, the diaphragm structure included features in its shape to overcome such defects; however, performance of individual pressure transmitters could be inconsistent. Hence, there is a need for an improved diaphragm structure and method of manufacturing a diaphragm structure.

SUMMARY

In a particular embodiment, a process transmitter includes a corrosion resistive housing including a flange portion, where the corrosion resistive housing is formed from a first material. The process transmitter also includes an outer ring formed from a second material. The outer ring has an inner diameter and is brazed to the flange portion. The process transmitter further includes a deformable diaphragm formed from a third material, the deformable diaphragm is welded to the outer ring at a weld seam between the diaphragm and the outer ring adjacent to the inner diameter to form a fluid seal.

In another particular embodiment, a method of manufacturing a pressure transmitter is disclosed that includes brazing an outer ring to a flange of a process transmitter housing formed from a corrosion resistant material, where the outer ring including a diaphragm receiving structure. The method further includes positioning an attachment portion of a diaphragm onto the diaphragm receiving structure, where the diaphragm is deformable across substantially an entirety of the diameter. The diaphragm is welded to the outer ring at the attachment portion to form a weld seal between the diaphragm and the outer ring.

In still another particular embodiment, a transmitter device includes a flange portion having a first inner diameter circumscribing a fluid cavity. The transmitter device also includes an outer ring having a second inner diameter corresponding to the first inner diameter. The outer ring includes a diaphragm receiving structure adjacent to the second inner diameter. The outer ring is brazed to the flange portion. The transmitter device further includes a deformable diaphragm having a mounting structure sized to mate with the receiving structure. The deformable diaphragm is welded to the outer ring at a weld seam between the diaphragm receiving structure and the mounting structure.

DETAILED DESCRIPTION OF ILLUSTRATIVE EMBODIMENTS

Figure 1:
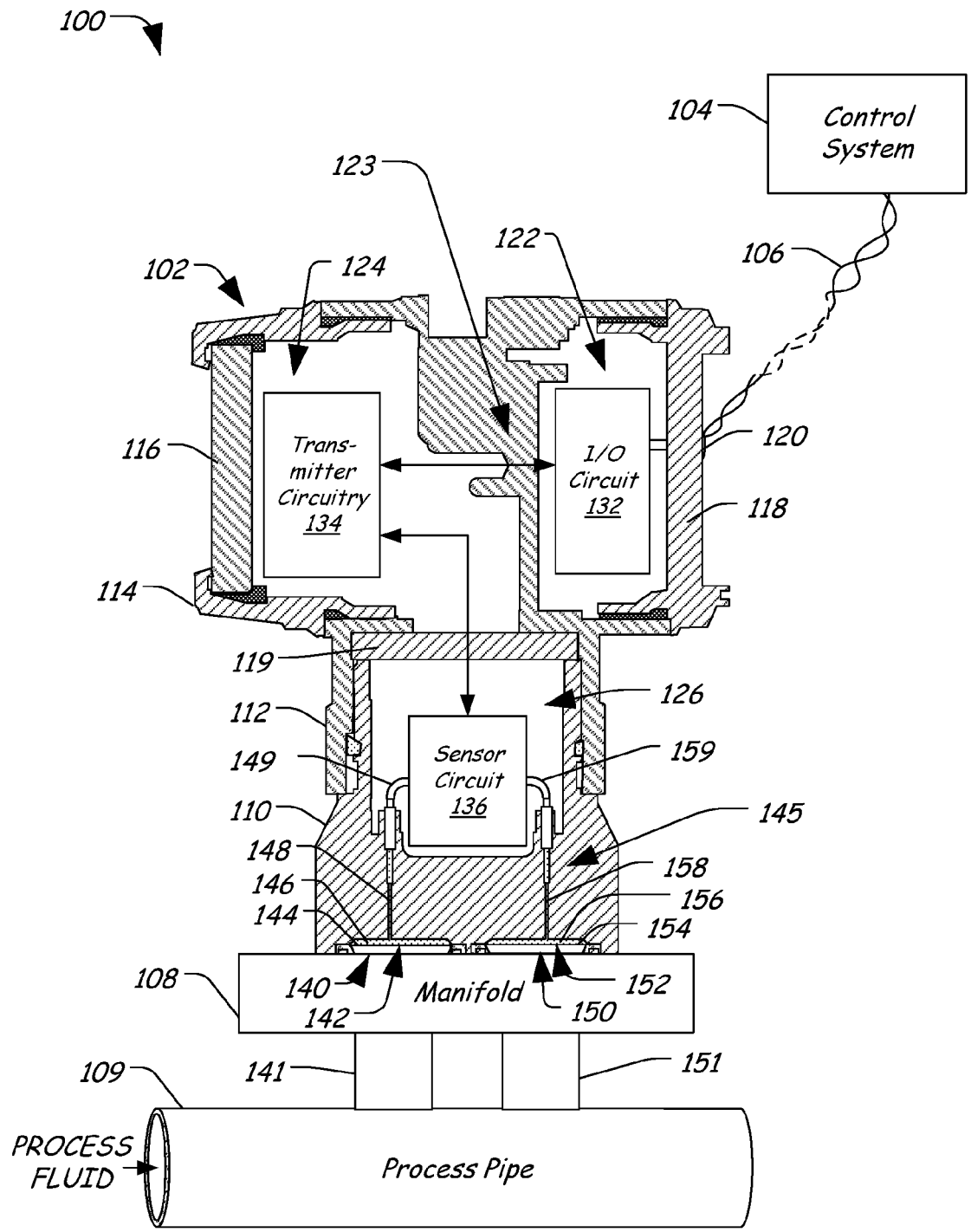
FIG. 1 is a diagram of a particular illustrative embodiment of a process control system including pressure transmitter having a diaphragm structure with a stamped diaphragm and a separate outer ring.

FIG. 1 is a diagram of a particular illustrative embodiment of a process control system 100 including a pressure transmitter 102 that communicates with a control system 104 via wiring 106. In an alternative embodiment, the pressure transmitter 102 may include a wireless transceiver to communicate with the control system 104 via a wireless communications link. The pressure transmitter 102 is illustrated in a partial cross-sectional view. The pressure transmitter 102 is coupled to a manifold 108 (or other attachment mechanism) via a base housing portion 110. In a particular embodiment, the manifold 108 may be coupled to a pipe 109 via a first line 141 and a second line 151. In another particular example, the manifold 108 or another attachment feature, such as a clamp, may couple the pressure transmitter 102 to a wall of a reservoir, to a other equipment, or any combination thereof. In a particular embodiment, the pressure transmitter 102 and the manifold 108 may be located at a distance from the process pipe 109 and the first and second lines 141 and 151 may be extended tubes.

The pressure transmitter 102 preferably includes the base housing portion 110, which is threadably attached to an upper housing portion 112. The base housing portion 110 defines a sensor cavity 126, a first fluid cavity 146 and a second fluid cavity 156. The sensor cavity 126 is isolated from the first and second fluid cavities 146 and 156 by a first isolation barrier 145.

The pressure transmitter 102 may preferably include a transmitter housing portion 114 and an input interface portion 118 that are threadably attached to the upper housing portion 112. The upper housing portion 112 and the transmitter housing portion 114 define a transmitter cavity 124. The transmitter housing portion 114 further includes a transmitter cover 116, which is adapted to protect transmitter circuitry 134 from a process environment. The input interface 118 includes one or more fasteners 120 for coupling to wiring 106. The input interface 118 and the upper housing portion 112 define an input/output interface cavity 122 that includes an input/output interface circuit 132. The input/output interface cavity 122 is isolated from the transmitter cavity 124 by a second isolation barrier 123. The input/output interface circuit 132 is coupled to the input interface 118 and to the transmitter circuitry 134 and is adapted to communicate data between the transmitter circuitry 132 and the control system 104.

The sensor cavity 126 is isolated from the transmitter circuit cavity 124 and from the input/output interface cavity 122 by a third isolation barrier 119. The sensor cavity 126 is adapted to secure a sensor circuit 136, such as a pressure sensor.

In this embodiment, the pressure transmitter 102 includes a first pressure interface 140 and a second pressure interface 150. The first pressure interface 140 includes a diaphragm structure 142 having a first diaphragm 144. The first diaphragm 144 includes a first isolation surface that contacts a process fluid received via the manifold 108 and the first line 141 and includes a first fluid cavity surface that contacts an isolation fill fluid within the first fluid cavity 146. The first diaphragm 144 isolates the first fluid cavity 146 from the process fluid. The first pressure interface 140 further includes a first capillary tube 148 that couples the first fluid cavity 146 to a first pressure inlet 149 of the sensor circuit 136.

The second pressure interface 150 includes a second diaphragm structure 152 having a second diaphragm 154. The second diaphragm 154 includes a second isolation surface that contacts the process fluid received via the manifold 108 and the second line 151 and includes a second fluid cavity surface that contacts isolation fill fluid within the second fluid cavity 156. The second diaphragm 154 isolates the second fluid cavity 156 from the process fluid. The second pressure interface 150 further includes a second capillary tube 158 that couples the second fluid cavity 156 to a second pressure inlet 159 of the sensor circuit 136.

In a particular embodiment, the first diaphragm 144 and the second diaphragm 154 are adapted to deform in response to a process fluid pressure, applying a compressive force to the fill fluid within the first and second fluid cavities 146 and 156 and within the corresponding first and second capillary tubes 148 and 158 in response to such deformation. The fill fluid is adapted to convey the process fluid pressure to the first pressure inlet 149 via the first capillary tube 148 in response to deformation of the first diaphragm 144. The fill fluid is also adapted to convey the process pressure to the second pressure inlet 159 via the second capillary tube 158 in response to deformation of the second diaphragm 154. In a particular embodiment, the sensor circuit 136 is adapted to determine a first process fluid pressure based on the deformation of the first diaphragm 144 via the fill fluid within the first capillary tube 148 and to determine a second process fluid pressure based on the deformation of the second diaphragm 154 via the fill fluid within the second capillary tube 158. In a particular example, the process pipe 109 may include an orifice plate, a shedding bar, an annubar structure, a Venturi tube, or another flow impedance device adapted to produce a differential pressure between the lines 141 and 151, such that the first and second diaphragm structures 142 and 152 experience different fluid pressures.

In a particular embodiment, the first diaphragm 144 includes a deformable diaphragm portion (such as the deformable diaphragm 304 illustrated in FIG. 3) and a separate mounting ring portion (such as the outer ring 306 illustrated in FIG. 3), where the separate mounting ring is brazed to the base housing portion 110 and where the deformable diaphragm portion is resistance welded or otherwise fixed to the separate mounting ring. In a particular example, the separate mounting ring and the deformable diaphragm portion are formed from different materials and are both formed from materials that are different from the base housing portion 110, which may be formed from stainless steel. In a particular embodiment, the separate mounting ring and the deformable diaphragm portion are formed from different materials and are attached to each other after the separate mounting ring is mounted to the base housing portion 110.

Figure 2:
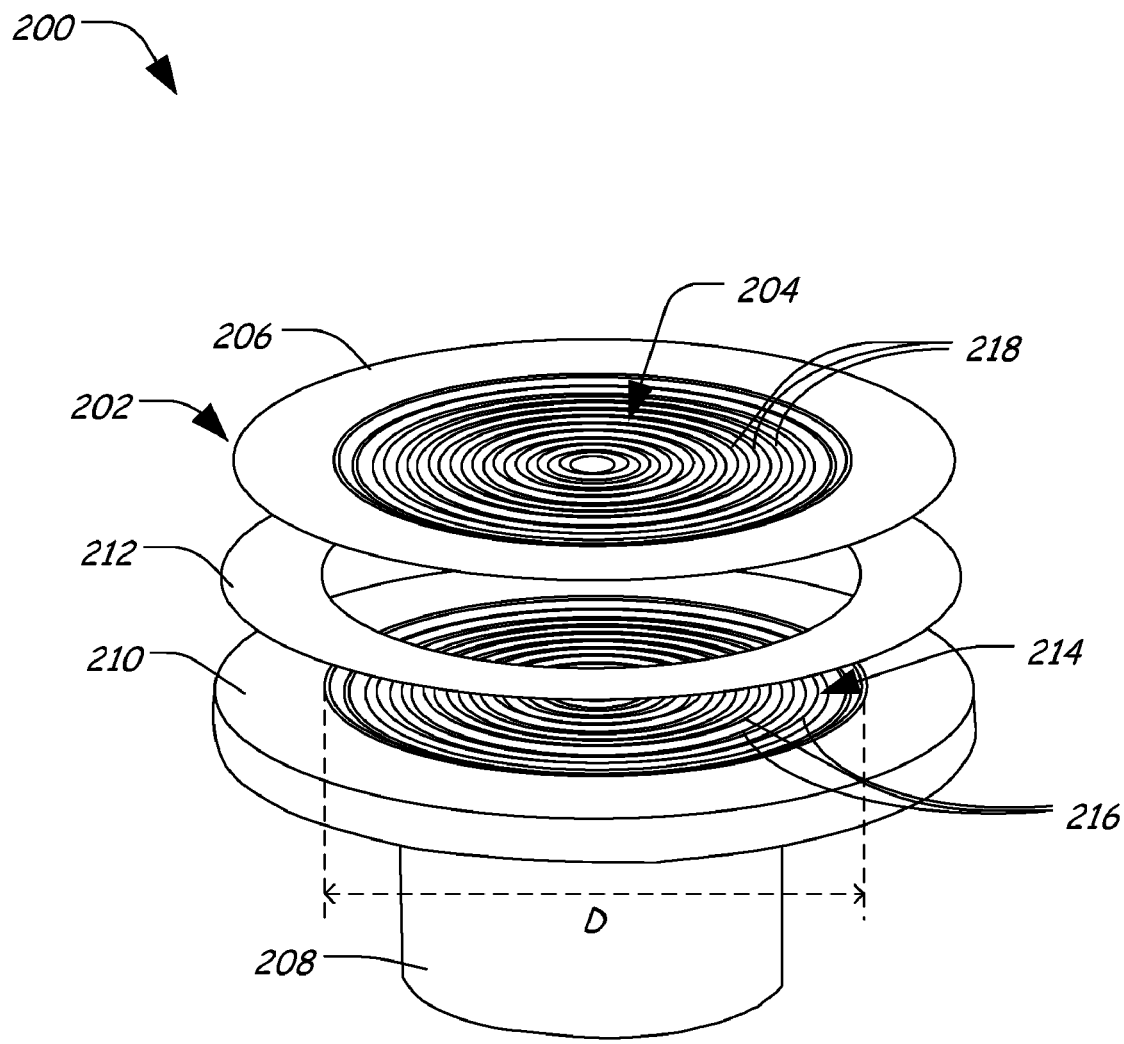
FIG. 2 is an exploded view of a conventional diaphragm structure including a one-piece diaphragm with an outer ring stamped from a single piece of material.

FIG. 2 is an exploded view of a conventional diaphragm structure 200 including a one-piece diaphragm 202 having a deformable diaphragm portion 204 and an outer ring portion 206. The one-piece diaphragm 202 is stamped from a single piece of material, such as a single sheet of Tantalum. The diaphragm structure 200 also includes a base transmitter housing 208, such as the base housing portion 110 in FIG. 1. The base transmitter housing 208 includes a flange portion 210 that has an inner diameter (D), which circumscribes a fluid cavity 214 including a plurality of ridges 216. The deformable diaphragm portion 204 also includes a corresponding plurality of ridges 218. The diaphragm structure 200 further includes a brazing ring 212, which is positioned between the outer ring portion 206 of the one-piece diaphragm 202 and the flange portion 210 of the base transmitter housing 208.

Conventionally, during a brazing process to join the one-piece diaphragm 202 to the flange portion 210 of the base transmitter housing 208, the flange portion 210 of the base transmitter housing 208 has a different coefficient of thermal expansion from the one-piece diaphragm 202. After brazing, the flange portion 210 cools at a different rate from the one-piece diaphragm 202, which may cause the outer ring portion 206 and/or the deformable diaphragm portion 204 to buckle. Such buckling of the one-piece diaphragm 202 may result in defects, which can cause device failures and/or inconsistent pressure readings.

Figure 3:
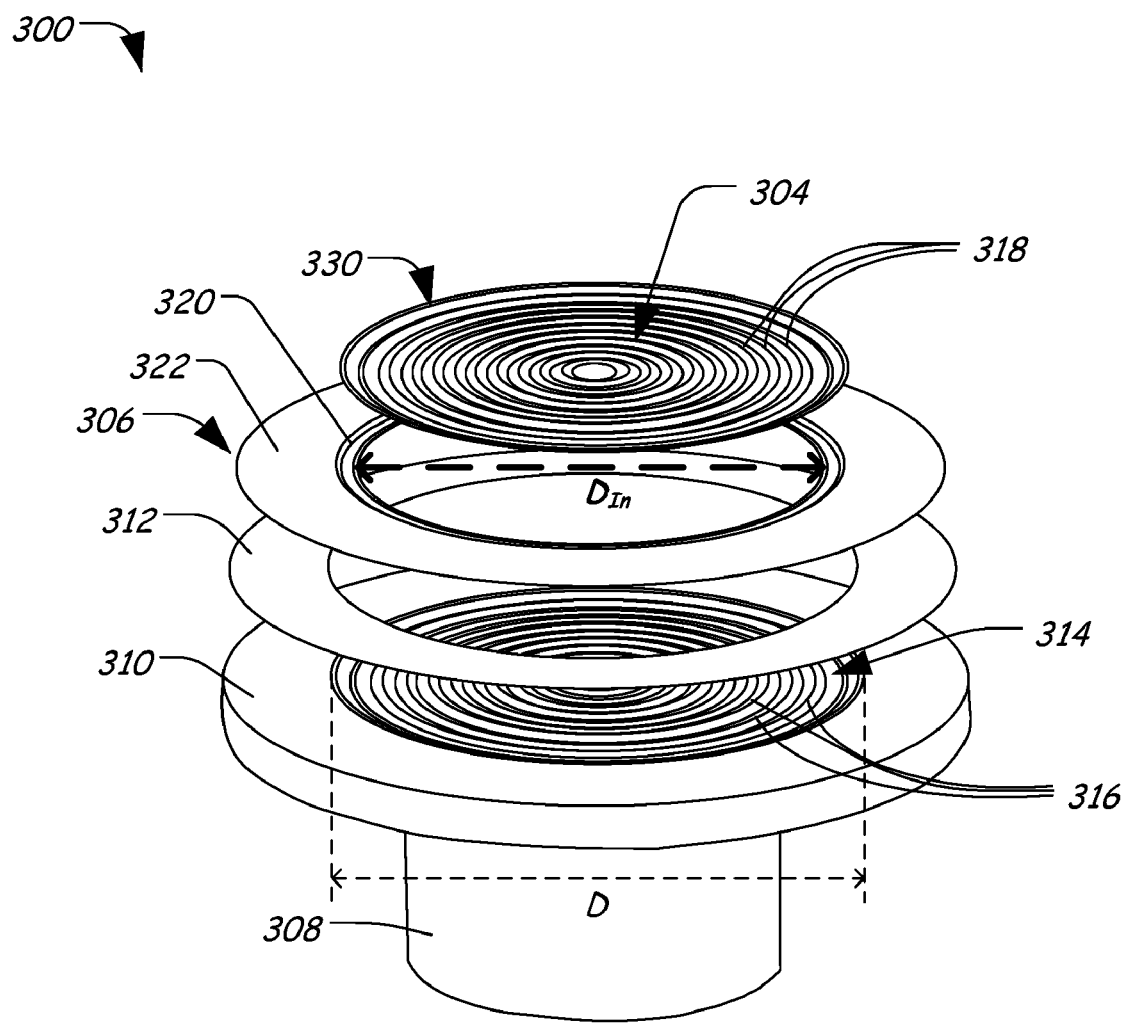
FIG. 3 is an exploded view of a particular illustrative embodiment of a diaphragm structure including a stamped diaphragm and a separate outer ring.

FIG. 3 is an exploded view of a particular illustrative embodiment of a diaphragm structure 300 including a stamped diaphragm 304 and a separate outer ring 306. The diaphragm structure 300 also includes a base transmitter housing 308, such as the base housing portion 110 in FIG. 1. The base transmitter housing 308 includes a base flange portion 310 having a diameter (D) that circumscribes a fluid cavity 314 including a plurality of ridges 316. The deformable diaphragm portion 304 also includes a corresponding plurality of ridges 318. The diaphragm structure 300 further includes a brazing ring 312, which is positioned between the separate outer ring 306 and the flange portion 310 of the base transmitter housing 308. The separate outer ring 306 includes a flange portion 322 that is adapted to mate with the base flange portion 310 of the base transmitter housing 308 via the brazing ring 312. The separate outer ring 306 also includes an inner diameter ($D_{In}$) and a diaphragm receiving structure 320 adjacent to the inner diameter ($D_{In}$) that is adapted to receive the deformable diaphragm 304. The deformable diaphragm 304 includes a mounting structure 330 that is adapted to mate with the diaphragm receiving structure 320 of the outer ring 306.

In a particular embodiment, the brazing ring 312 is positioned on the base flange portion 310 of the base transmitter housing 308. The separate outer ring 306 is positioned on the brazing ring 312. The separate outer ring 306, the base transmitter housing 308, and the brazing ring 312 are heated to an elevated temperature and cooled to braze the separate outer ring 306 to the base transmitter housing 308. After the resulting structure is cooled, the deformable diaphragm 304 is positioned to mate the mounting structure 330 with the diaphragm receiving structure 320. The deformable diaphragm 304 is welded to the separate outer ring 306. In a particular embodiment, the deformable diaphragm 304 is welded to the separate outer ring 306 using a resistance welding process. In another particular embodiment, the deformable diaphragm 304 is welded to the separate outer ring 306 via a laser weld process. In other embodiments, different welding or attachment processes may be used to attach the deformable diaphragm 304 to the mounting structure 320 of the separate outer ring 306. In a particular embodiment, a weld seam is formed at an interface between the diaphragm receiving structure 320 of the outer ring 306 and the mounting structure 330 of the diaphragm 304.

In general, multiple performance and manufacturing improvements can be realized by separating the outer ring 306 and the deformable diaphragm 304 and by separately attaching the deformable diaphragm 304 to the outer ring 306. In one particular example, a diaphragm material and a corresponding thickness of the deformable diaphragm 304 can be selected to enhance a diaphragm spring rate, resulting in reduced temperature effects, reduced diaphragm stiffness, and improved measurement accuracy of the overall pressure sensing system. In some instances, the diaphragm spring rate may be comparable to spring rates of similar parts that have resistance-welded diaphragms.

Additionally, unlike conventional diaphragm structures that may experience buckling and deformation due to thermal coefficient of expansion effects (such as the one-piece diaphragm structure 202 illustrated in FIG. 2), the diaphragm structure 300 can be manufactured with reduced buckling and reduced deformation, resulting in enhanced spring rate performance from piece-to-piece and more consistent performance overall. In a particular example, the active area of the deformable diaphragm 304 is not subjected to brazing so the deformable diaphragm 304 performs more consistently. In a particular example, a diaphragm having a thickness of 2 mils can be manufactured and welded to the outer ring 306 reliably, resulting in enhanced accuracy for such thin-diaphragm products. Further, diaphragms having such thicknesses can be made more widely available as standard products. Additionally, by separating the outer ring 306 from the deformable diaphragm 304, the process disclosed provides great flexibility in choosing diaphragm thicknesses. The diaphragm thickness can be selected to accommodate customer performance requirements. Further, by splitting the deformable diaphragm 304 from the raised face of the outer ring 306, a standard diaphragm can be used that is common to other existing products rather than requiring a custom diaphragm.

Another particular advantage is provided in that the diaphragm structure 300 may be produced with a thicker outer ring 306 and a thinner deformable diaphragm 304, which enhances robustness for certain outer rings and which reduces unwanted temperature effects. Yet another advantage is provided in that production scrap material is reduced, improving overall profit, reducing disruptions in production scheduling, improving on-time delivery, and enhancing efficiency of operating equipment. Such reduced production of scrap material results from a more reliable manufacturing process.

Further, the overall manufacturing process is simplified, since the deformable diaphragm 304 is not exposed to the brazing process. Since the overall process is simplified, moderately skilled workers may be used instead of specialists. Additionally, even with less skilled workers, the manufacturing process with a braze process to attach the outer ring 306 and a separate weld process to attach the deformable diaphragm 304 to the outer ring 306 results in very high yield rates, allowing for significant reductions in rejected work pieces. Moreover, the process allows for double stacking of parts in a braze oven resulting in more efficient use of the ovens and up to a hundred percent (100%) improvement in production rate. In a particular example, combined with the reduction in scrap, the improved yield rate from each oven batch can be up to approximately one thousand percent (1000%).

Figure 4:
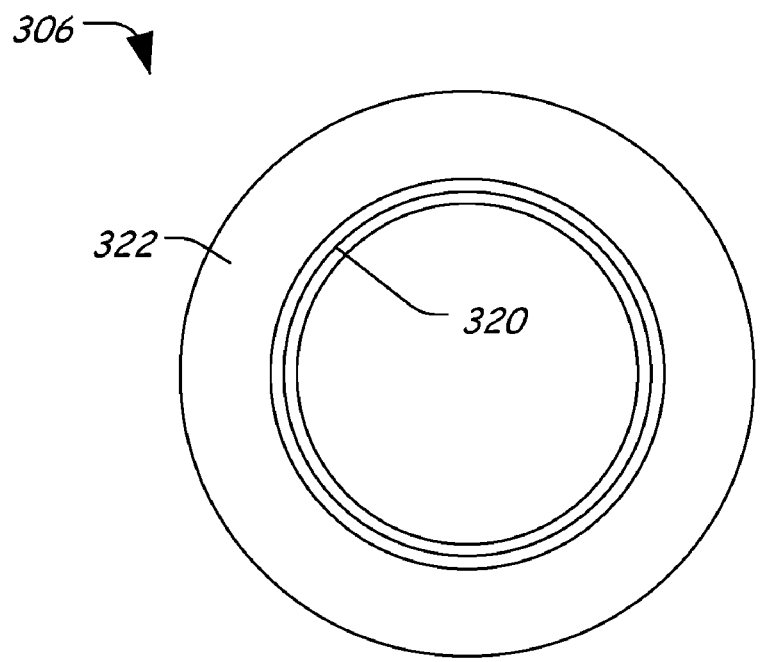
FIG. 4 is a top view of the separate outer ring of FIG. 3.

FIG. 4 is a top view of the separate outer ring 306 of FIG. 3. The separate outer ring 306 includes a flange portion 402 that is adapted to mate with a corresponding flange portion of the base transmitter housing and with a corresponding brazing ring, such as the brazing ring 312 and the flange 310 illustrated in FIG. 3. The separate outer ring 306 further includes a diaphragm receiving structure 320 that is adapted to receive or interface with an attachment portion of a deformable diaphragm, such as the mounting structure 330 of the deformable diaphragm 304 illustrated in FIGS. 3 and 5.

Figure 5:
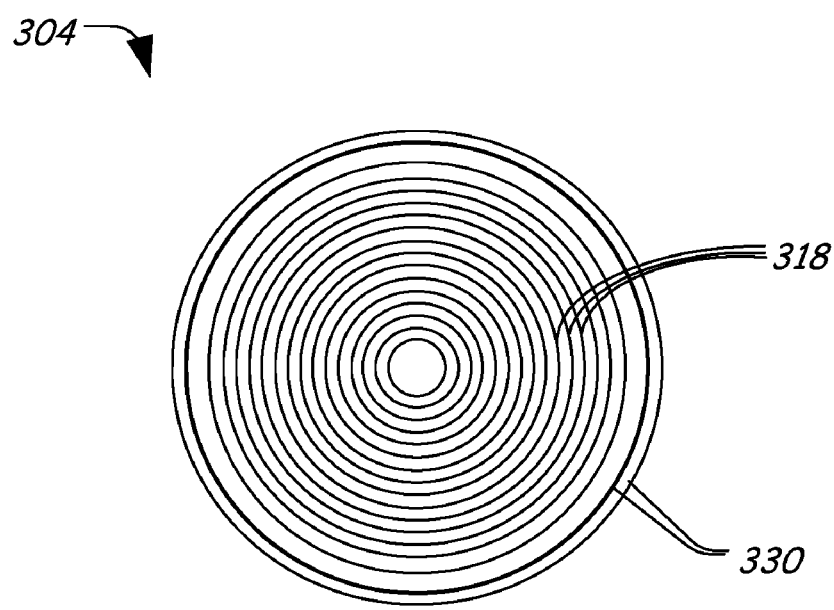
FIG. 5 is a top view of the separate diaphragm of FIG. 3.

FIG. 5 is a top view of the separate diaphragm 304 of FIG. 3. The deformable diaphragm 304 includes the mounting structure 330 that corresponds to the diaphragm receiving structure 320 of the separate outer ring 306 illustrated in FIG. 4. The deformable diaphragm 304 includes a plurality of ridges 318. The mounting structure 330 is adapted to mate with the diaphragm receiving structure 320 of the outer ring 306 (illustrated in FIG. 4) to facilitate attachment of the deformable diaphragm 304 to the separate outer ring 306. In a particular embodiment, a resistance seam weld process may be used to attach the deformable diaphragm 304 to the outer ring 306. A weld seam is formed between the diaphragm receiving structure 320 of the separate outer ring 306 (illustrated in FIG. 4) and the mounting structure 330 of the deformable diaphragm 304. The weld seam forms a process seal.

In general, resistance welding refers to a welding process in which an electrical current and pressure are applied to a work piece in order to weld the work piece to a second work piece at a joint. In a particular example, electrical resistance of the outer ring 306 to an applied electrical current results in heat that partially melts work piece material at the mounting structure 320. Concurrent application of pressure to the outer ring 306 and the deformable diaphragm 304 as the electrical current is applied causes a seam weld that can attach the deformable diaphragm 304 to the outer ring 306. Resistance seam welding is an example. In other examples, the deformable diaphragm 304 may be fixed to the outer ring 306 via laser weld process, other precision weld processes, or any combination thereof.

Figure 6:
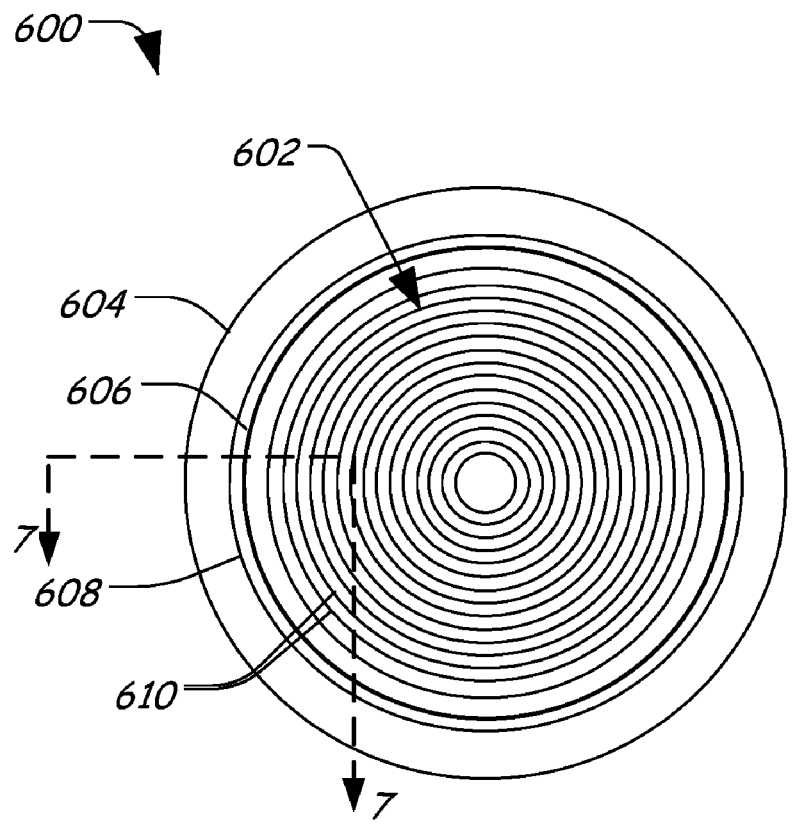
FIG. 6 is a bottom view of a particular embodiment of a diaphragm structure after the outer ring is brazed to a pressure transmitter housing and after the diaphragm is resistance welded to the outer ring.

FIG. 6 is a bottom view of a particular embodiment of a diaphragm structure 600 after an outer ring 604 is brazed to a pressure transmitter housing and after a diaphragm 602 is resistance welded to the outer ring 604. The diaphragm 602 includes a mounting structure 606 and a plurality of ridges 610. A resistance weld seam between the diaphragm 602 and the outer ring 604 is generally indicated at 608.

In a particular embodiment, by separating the diaphragm structure 600 into two pieces, the outer ring 604 can be brazed to a stainless steel housing and the diaphragm 602 can be resistance seam welded to the outer ring 604 via separate processes. The diaphragm 602 is welded to the outer ring 604 near an inner diameter of the outer ring 604. By separating the attachment of the outer ring 604 from the attachment of the diaphragm 602, distortion resulting from the braze process is reduced for the active diaphragm area, i.e., for a portion of the diaphragm 602 that is deformable in response to fluid pressure. In a particular example, the diaphragm 602 can be formed of a different material from the outer ring 604. For example, the outer ring 604 may be formed from Tantalum and the deformable diaphragm 606 can be formed from Hastelloy, Gold, Zirconium, Platinum, Titanium, other materials, or any combination thereof.

In another particular embodiment, the outer ring 604 and the diaphragm 602 may have different thicknesses. In a particular example, different diaphragm thicknesses can be used to comply with customer requests and to enhance particular performance parameters, such as pressure sensitivity. For manufacturing, the same outer ring 604 may be used with a variety of diaphragms having different thicknesses according to the particular implementation. In a particular embodiment, separation of the diaphragm 602 from the outer ring 604 allows for the use of attachment processes capable of welding thinner diaphragm materials on the same part so that the same outer ring 604 may be used with different deformable diaphragms 602.

In a particular example, by separating the diaphragm structure 600 into a diaphragm 602 and a separate outer ring 604, the spring rate performance of the diaphragm 602 may be improved. Further, piece-to-piece performance variability may be reduced, in part, due to reduction or elimination of deformation areas at a periphery of the diaphragm 602 due to brazing. Additionally, elimination or reduction of such deformation areas enhances long-term durability. Moreover, separation of the outer ring 604 from the diaphragm 602 allows a thicker lining to be used for a gasket area (i.e., a thicker outer ring 604 may be used) without impacting performance of the diaphragm 602. Further, such separation enhances a potential for supplying parts with a Tantalum outer ring 604 with diaphragms of other material types, such as Hastelloy, Gold, Zirconium, Platinum, Titanium, other materials, or any combination thereof. In a particular example, the diaphragm material may be selected based on desired performance characteristics, availability, cost, or any combination thereof.

Figure 7:
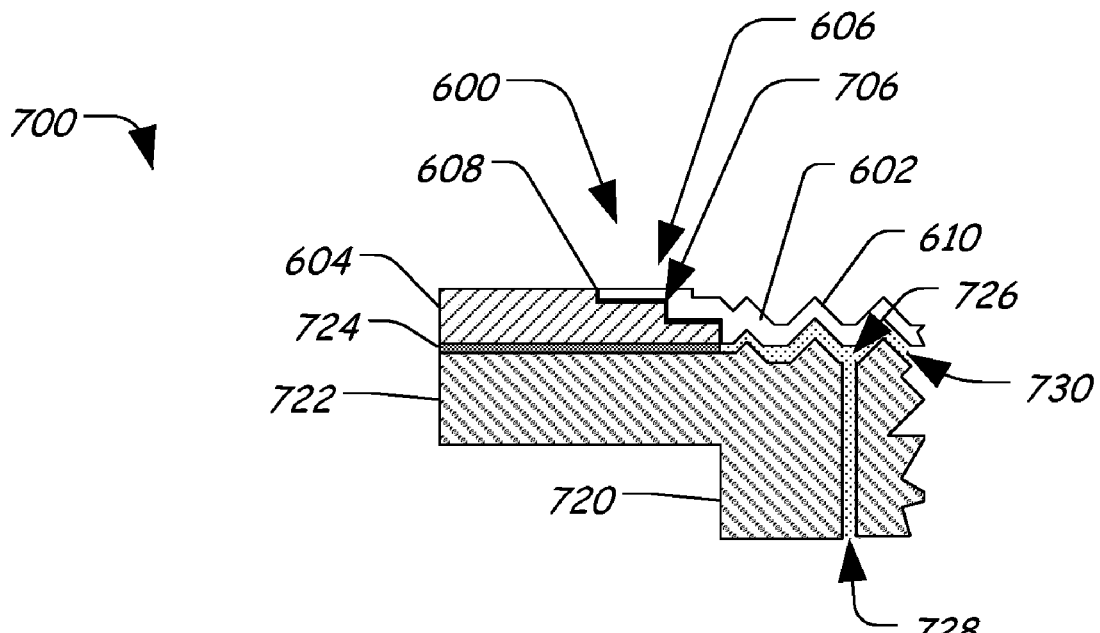
FIG. 7 is a cross-sectional view of the diaphragm structure of FIG. 6 taken along line 7-7 in FIG. 6.

FIG. 7 is a cross-sectional view 700 of the diaphragm structure 600 of FIG. 6 taken along line 7-7 in FIG. 6. The diaphragm structure 600 includes an outer ring 604 coupled to a diaphragm 602 at a mounting structure 606 and a corresponding receiving structure 706 via a resistance seam weld 608. The diaphragm 602 includes a plurality of ridges 610. The outer ring 604 is coupled to a flange portion 722 of a process transmitter housing 720 via a braze joint 724. The process transmitter housing 720 defines a fluid cavity 726 and a capillary tube 728 that are filled with a substantially incompressible fill fluid, generally indicated at 730.

In a particular example, during operation, the diaphragm 602 can deform in response to fluid pressure, compressing the substantially incompressible fill fluid 730 and applying a compressive force to the fill fluid 730. The applied pressure may be detected by a sensor that is coupled to the capillary tube 728, such as the sensor circuit 136 coupled to the capillary tubes 148 and 158 illustrated in FIG. 1.

Figure 8:
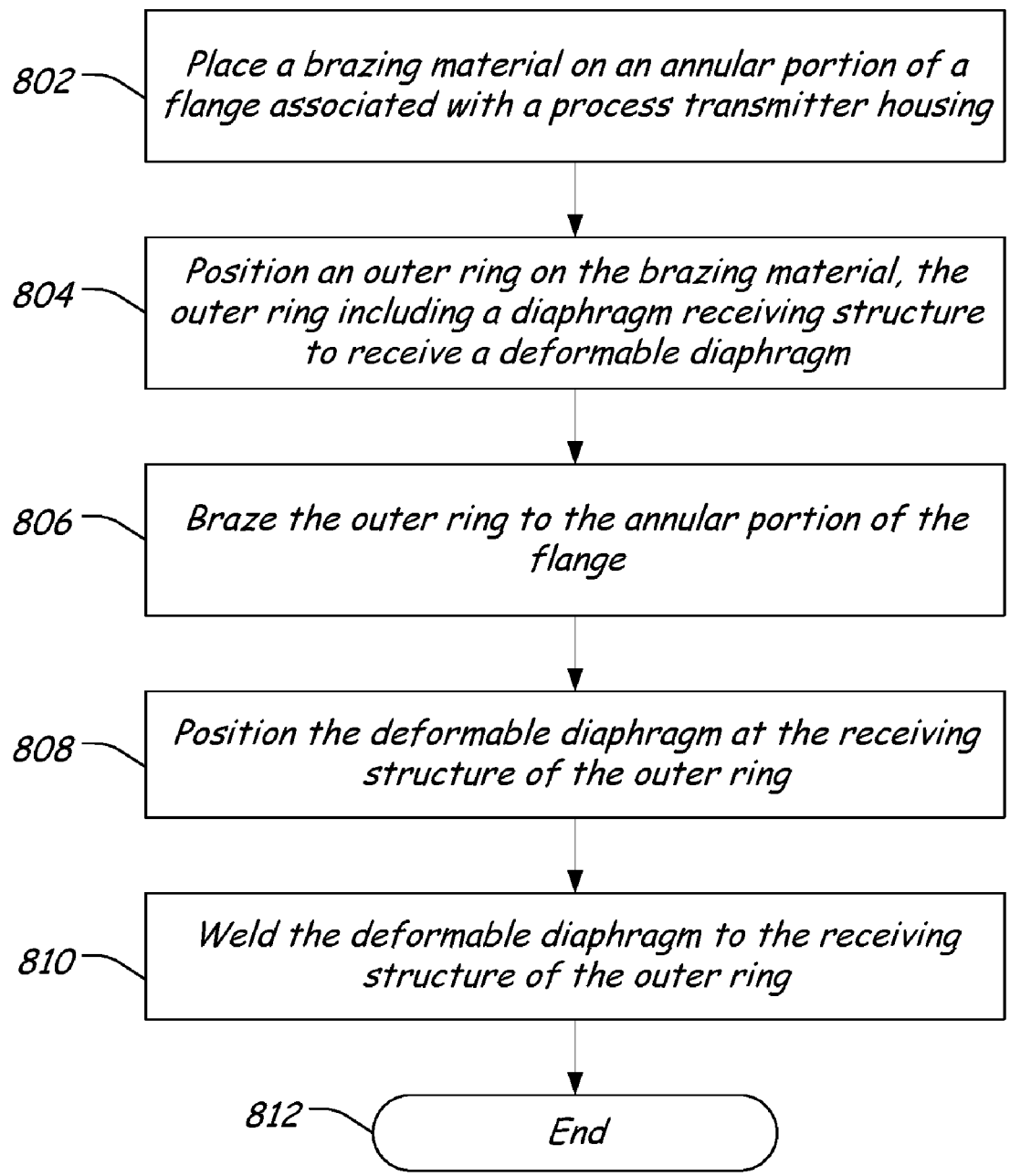
FIG. 8 is a flow diagram of a particular illustrative embodiment of a method of manufacturing a diaphragm structure having stamped diaphragm and a separate outer ring.

FIG. 8 is a flow diagram of a particular illustrative embodiment of a method of manufacturing a diaphragm structure having stamped diaphragm and a separate outer ring. At 802, a brazing material is placed on a portion of a flange associated with a process transmitter housing. The flange portion may be annular and may have an inner diameter (D) that surrounds (circumscribes) a fluid cavity, such as the fluid cavity 314 illustrated in FIG. 3. Advancing to 804, an outer ring is positioned on the brazing material, where the outer ring includes a diaphragm receiving structure adapted to receive a deformable diaphragm. Moving to 806, the outer ring is brazed to the annular portion of the flange. The brazing process includes elevating a temperature of the flange, the brazing material, and the outer ring and cooling the structure to weld the outer ring to the flange. Continuing to 808, a deformable diaphragm is positioned at the receiving structure of the outer ring. Proceeding to 810, the deformable diaphragm is welded to the receiving structure of the outer ring. The method terminates at 812.

Figure 9:
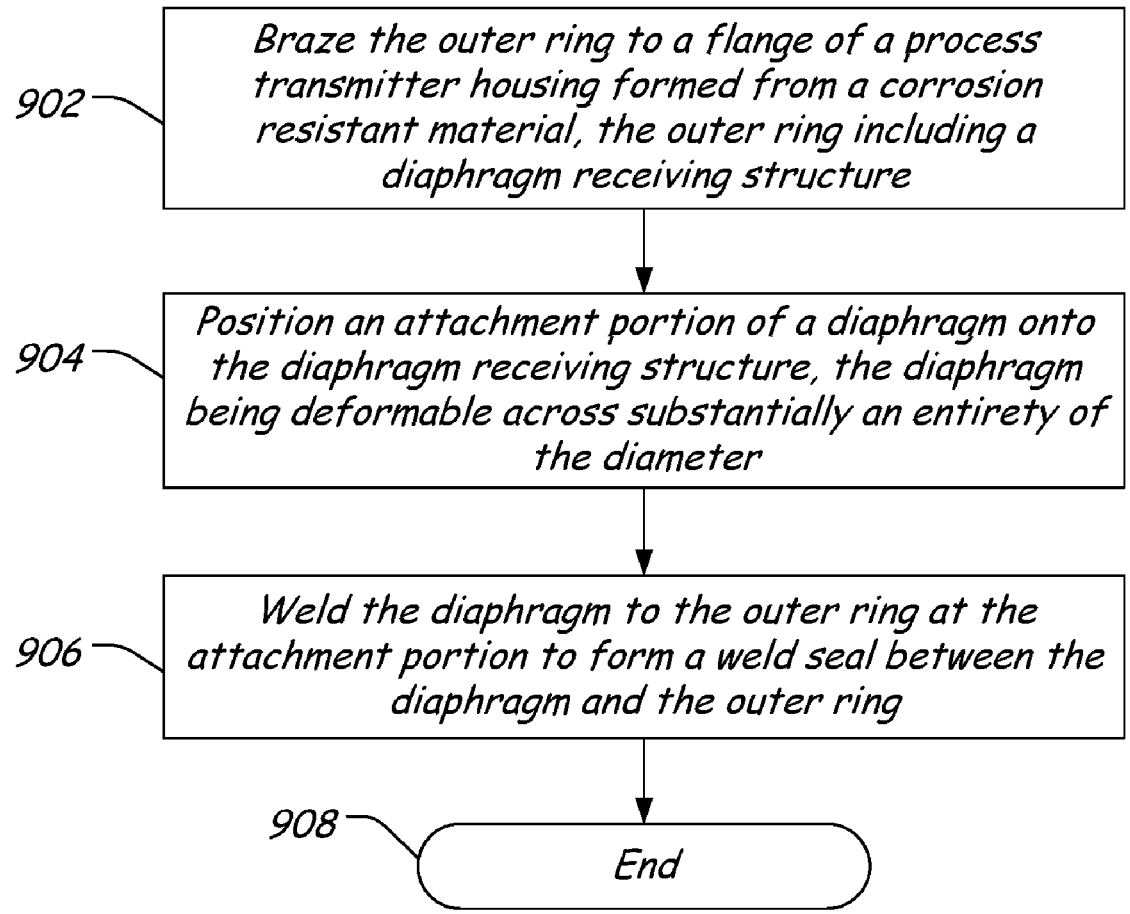
FIG. 9 is a flow diagram of a second particular illustrative embodiment of a method of manufacturing a transmitter device including a stamped diaphragm and a separate outer ring.

FIG. 9 is a flow diagram of a second particular illustrative embodiment of a method of manufacturing a transmitter device including a stamped diaphragm and a separate outer ring. At 902, an outer ring is brazed to a flange of a process transmitter housing formed from a corrosion resistant material, the outer ring including a diaphragm receiving structure. In a particular embodiment, the corrosion resistant material is stainless steel and the outer ring is formed from Tantalum. In a particular example, multiple outer rings can be brazed to respective transmitter housings concurrently. Continuing to 904, an attachment portion of a diaphragm is positioned onto the diaphragm receiving structure, where the diaphragm is deformable across substantially an entirety of the diameter. In a particular embodiment, the diaphragm is selected that has a diaphragm thickness of approximately 2 mil. In another particular embodiment, the diaphragm is formed from Hastelloy, Gold, Zirconium, Platinum, Titanium, another material, or any combination thereof. Proceeding to 906, the diaphragm is welded to the outer ring at the attachment portion to form a weld seal between the diaphragm and the outer ring. The method terminates at 908.

In a particular embodiment, the outer ring has an inner diameter and the diaphragm receiving structure is adjacent to the inner diameter. The diaphragm includes a mounting structure corresponding to the diaphragm receiving structure of the outer ring, and the weld seal is formed between the diaphragm receiving structure and the mounting structure. In another particular embodiment, welding the diaphragm to the outer ring includes positioning the mounting structure of the diaphragm relative to the diaphragm receiving structure of the outer ring, applying an electrical current to at least one of the outer ring and the diaphragm, and concurrently pressing the outer ring and the diaphragm together to resistance weld the diaphragm to the outer ring.

In a particular example, the method further includes determining desired performance parameters for a process transmitter. Such performance parameters may be determined based on how the process transmitter is to be used. A material composition of the diaphragm (such as Hastelloy, Gold, Zirconium, Platinum, Titanium, or other materials) and a corresponding diaphragm thickness are determined that satisfy the desired performance parameters, and the diaphragm formed from the material composition and having the corresponding diaphragm thickness is selected that satisfies the desired performance parameters.

In general, though the above-examples were directed to a pressure transmitter and to isolating diaphragms, it should be understood that the process of joining dissimilar metals may be applied to other structures as well. The methods and the associated structures illustrate particular examples of techniques for brazing a first material to a second material and for welding a third material to the second material so that the resulting structure is free from defects that might otherwise result from brazing materials that have different thermal coefficients of expansion.

Although the present invention has been described with reference to preferred embodiments, workers skilled in the art will recognize that changes may be made in form and detail without departing from the spirit and scope of the invention.

What is claimed is:

1. A process transmitter comprising:
   a corrosion resistive housing including a flange portion, the corrosion resistive housing formed from a first material;
   an outer ring formed from a second material, the outer ring brazed to the flange portion, the outer ring having an inner diameter; and
   a deformable diaphragm formed from a third material, the deformable diaphragm welded to the outer ring at a weld seam between the deformable diaphragm and the outer ring adjacent to the inner diameter, the weld seam forming a fluid seal.

2. The process transmitter of claim 1, wherein the outer ring includes a diaphragm receiving structure disposed adjacent to the inner diameter, and wherein the deformable diaphragm includes a mounting structure adapted to mate with the diaphragm receiving structure.

3. The process transmitter of claim 1, wherein the outer ring has a first thickness that is greater than a second thickness of the deformable diaphragm.

4. The process transmitter of claim 1, wherein the second material comprises Tantalum.

5. The process transmitter of claim 1, wherein the third material comprises one of Hastelloy and Titanium.

6. The process transmitter of claim 1, wherein the third material comprises one of Gold, Zirconium, and Platinum.

7. The process transmitter of claim 1, wherein the diaphragm is resistance seam welded to the outer ring.

8. The process transmitter of claim 1, wherein the first material comprises stainless steel.

9. A method of manufacturing a pressure transmitter, the method comprising:
   brazing an outer ring to a flange of a process transmitter housing formed from a corrosion resistant material, the outer ring including a diaphragm receiving structure, the flange of a first material and the outer ring of a second material;
   positioning an attachment portion of a diaphragm onto the diaphragm formed of a third material receiving structure, the diaphragm being deformable across substantially an entirety of the diameter; and
   welding the diaphragm to the outer ring at the attachment portion to form a weld seal between the deformable diaphragm and the outer ring to the weld seal forming a fluid seal.

10. The method of claim 9, wherein the outer ring has an inner diameter and wherein the diaphragm receiving structure is adjacent to the inner diameter.

11. The method of claim 10, wherein welding the selected diaphragm to the outer ring comprises:
   applying an electrical current to at least one of the outer ring and the diaphragm; and
   concurrently pressing the outer ring and the diaphragm together to resistance weld the diaphragm to the outer ring.

12. The method of claim 9, wherein the process transmitter housing is formed of stainless steel and wherein the outer ring is formed of Tantalum.

13. The method of claim 12, wherein the diaphragm comprises one of Hastelloy, Gold, Zirconium, Platinum, and Titanium.

14. The method of claim 9, wherein the diaphragm has a diaphragm thickness of approximately 2 mil.

15. The method of claim 9, wherein selecting the diaphragm comprises:
   determining desired performance parameters for a process transmitter;
   determining a material composition and a corresponding diaphragm thickness that satisfy the desired performance parameters; and
   selecting the diaphragm formed from the material composition and having the corresponding diaphragm thickness that satisfies the desired performance parameters.

16. The method of claim 9, wherein brazing the outer ring comprises brazing multiple outer rings to respective transmitter housings concurrently.

17. A transmitter device comprising:
   a flange portion formed from a first material having an first inner diameter circumscribing a fluid cavity;
   an outer ring formed from a second material including a second inner diameter corresponding to the first inner diameter, the outer ring comprising a diaphragm receiving structure adjacent to the second inner diameter; the outer ring brazed to the flange portion; and
   a deformable diaphragm formed from a third material including a mounting structure sized to mate with the receiving structure, the deformable diaphragm welded to the outer ring at a weld seam between the diaphragm receiving structure and the mounting structure the weld seam forming a fluid seal.

18. The transmitter device of claim 17, wherein the deformable diaphragm has a first thickness that is less than a second thickness of the outer ring.

19. The transmitter device of claim 17, wherein the outer ring comprises Tantalum and wherein the deformable diaphragm is formed from a second material.

20. The transmitter device of claim 19, wherein the second material comprises at least one of Hastelloy, Gold, Zirconium, Platinum, and Titanium.

21. The transmitter device of claim 17, wherein the deformable diaphragm is resistance seam welded to the outer ring.

* * * * *